United States Patent [19]

Cojocari et al.

[11] Patent Number: 4,854,643

[45] Date of Patent: Aug. 8, 1989

[54] SEAT CONSTRUCTION

[75] Inventors: Brian S. Cojocari, Walnut, Calif.; Joseph R. Shivers, Novi, Mich.

[73] Assignee: Wickes Manufacturing Company, Southfield, Mich.

[21] Appl. No.: 233,868

[22] Filed: Aug. 15, 1988

Related U.S. Application Data

[63] Continuation of Ser. No. 53,185, May 22, 1987, abandoned, which is a continuation-in-part of Ser. No. 801,530, Nov. 25, 1985, abandoned.

[51] Int. Cl.⁴ .............................................. F16F 3/02
[52] U.S. Cl. .................................. 297/452; 267/110; 297/458
[58] Field of Search ............... 297/452, 454, 455, 458; 5/247, 255, 260, 275, 276, 476; 267/103, 104, 106, 110, 111

[56] References Cited

U.S. PATENT DOCUMENTS

| | | | |
|---|---|---|---|
| 2,251,103 | 7/1941 | Bank | 267/111 |
| 2,875,819 | 3/1959 | Hoag | 297/458 X |
| 3,554,526 | 1/1971 | Ohta | 267/103 X |
| 4,325,542 | 4/1982 | Muzzell | 267/106 X |
| 4,407,492 | 10/1983 | Muzzell | 267/103 |
| 4,606,532 | 8/1986 | Kazaoka et al. | 267/103 X |

FOREIGN PATENT DOCUMENTS

511299  3/1955  Canada .............................. 267/103

Primary Examiner—Peter R. Brown
Attorney, Agent, or Firm—David A. Greenlee

[57] ABSTRACT

A self-contained and self-supporting wire suspension system is provided for use within a seat construction. The system includes either one bolster wire or a pair of parallel bolster wires, a set of parallel stringer wires wrapped around the bolster wire(s), and a pair of parallel border wires secured to the free ends of the stringer wires. The system further includes a top or seat supporting portion defined by the segments of the stringer wires which extend between the bolster wires or between one border wire and a bolster wire. The top portion is resiliently supported by at least one leg portion defined by stringer wire segments extending between bolster and border wires. The border wires are secured to a support surface or a wire frame. Lateral support members extend diagonally between the leg portions to provide stability. The stringer wires may be embedded within a plastic foam seat cushion.

4 Claims, 6 Drawing Sheets

SEAT CONSTRUCTION

CROSS-REFERENCE TO RELATED APPLICATIONS

This application is a continuation of application Ser. No. 053,185 filed May 22, 1987, which is a continuation in part of application Ser. No. 801,530, filed Nov. 25, 1985, both now abandoned.

BACKGROUND OF THE INVENTION

1. Field of the Invention.

The field of the invention relates to seat constructions for motor vehicle seats and the like.

2. Brief Description of the Prior Art.

Supporting spring structures for seating assemblies have commonly included load-bearing wires supported by spring elements or the like. U.S. Pat. No. 3,639,002, which is incorporated by reference herein, discloses such a structure. A plurality of transversely extending wires are each double wrapped about a pair of parallel, longitudinally extending wires. Free ends of the transversely extending wires extend beyond the longitudinal wires at an angle with respect to the plane defined thereby. An additional wire connects the free ends. The entire assembly may be supported by a cantilevered spring structure and embedded in foam.

U.S. Pat. Nos. 2,934,133, 3,248,745 and 4,325,542 are representative of other spring seat constructions known to the art. The construction disclosed in the latter patent has the advantage of inherently retaining its assembly to a seat frame without requiring additional components for installation or support.

SUMMARY OF THE INVENTION

A self-contained seat suspension unit is provided which is easily installed, requires only a flat mounting surface, and is stable in all types of seat frames. The unit includes a plurality of stringer wires which run substantially parallel to each other. The stringer wires are wrapped about at least one bolster wire and have free ends secured to border wires. If necessary, means are provided for stabilizing the unit. In one embodiment of the invention, the stabilizing means include cross wires extending between a bolster wire on one side of the unit and a border wire on the opposite side thereof.

When incorporated within a seat construction, the border wires are secured to a seat frame, a flat mounting surface with tabs extending therefrom, or a wire frame. The border wires may extend well beyond the stringer wires to provide additional mounting support areas. Bends may be formed therein to prevent movement of the unit in any direction with respect to the mounting surface.

DETAILED DESCRIPTION OF THE INVENTION

Figure 1:
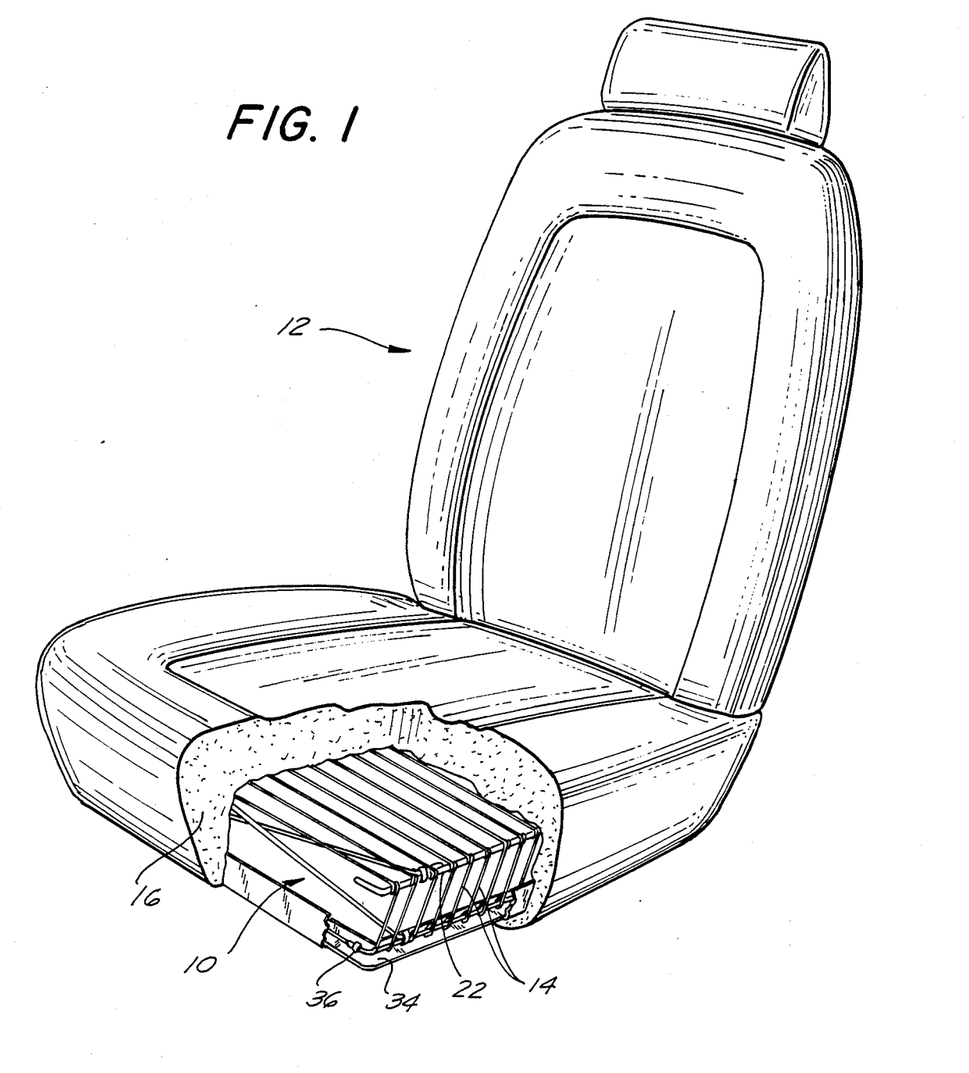
FIG. 1 is a partially cutaway perspective view of a seat construction according to the invention.
Figure 2:
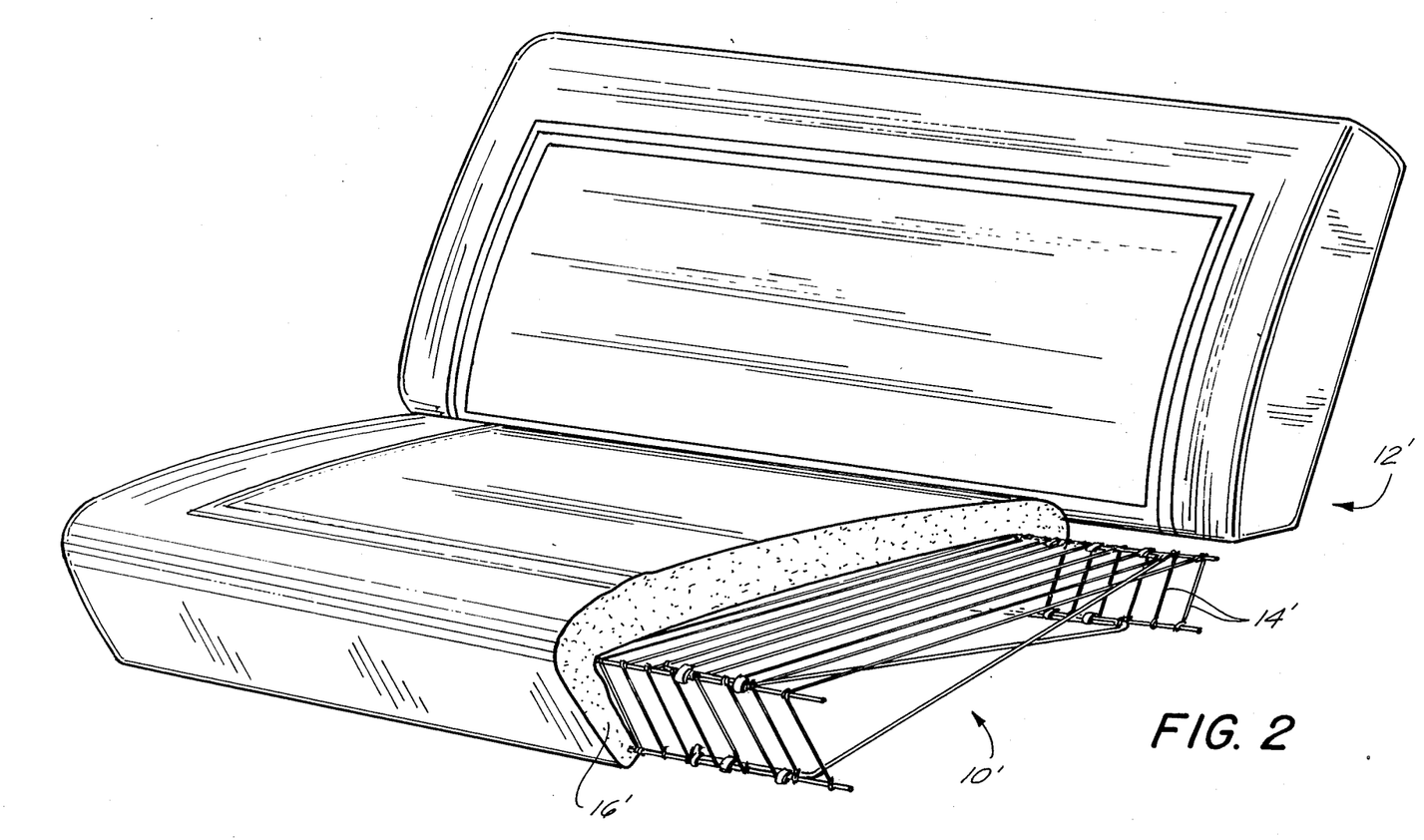
FIG. 2 is a partially cutaway perspective view of a seat construction according to a second embodiment of the invention.

FIGS. 1 and 2 illustrate bucket and bench type motor vehicle seat constructions which include self-contained and self-supporting suspension systems as discussed hereinafter. The suspension system 10 employed within the bucket seat 12 includes a plurality of parallel stringer wires 14 extending laterally with respect to the seat. In contrast, the stringer wires 14' of the suspension system 10' shown in FIG. 2 extend longitudinally with respect thereto. The terms longitudinal and lateral as employed hereinafter are accordingly used in their relative rather than absolute sense. Both suspension systems are embedded within the plastic foam seat portions 16, 16' of the bucket 12 and bench 12' seats, respectively.

Figure 3:
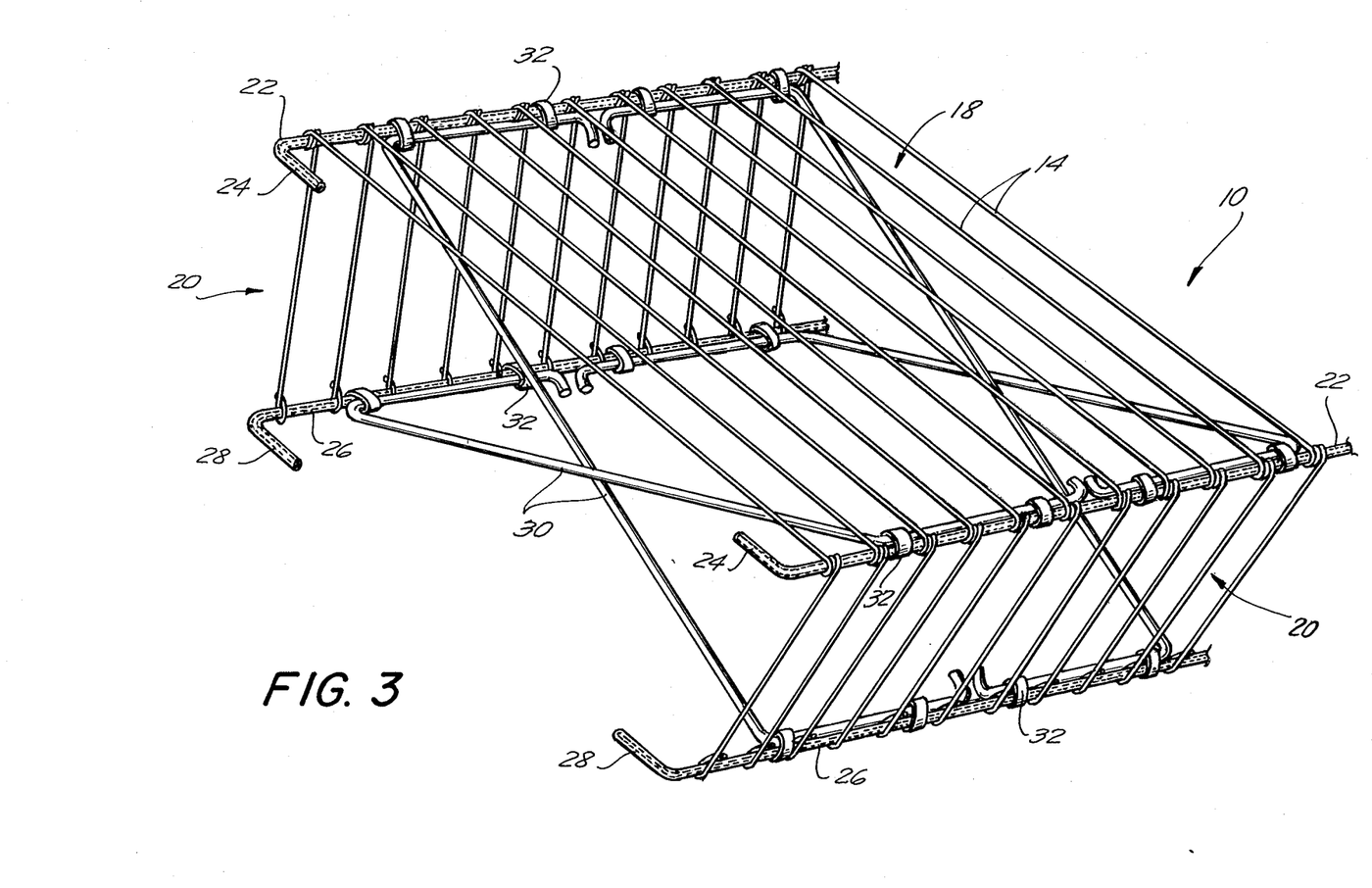
FIG. 3 is a perspective view of a wire frame, a portion of which is shown in FIG. 1.

Referring now to FIG. 3, the suspension system 10 includes a top portion 18 defined by the intermediate portions of the stringer wires 14 and two supporting leg portions 20 defined by the free end portions of said wires. Each stringer wire is double wrapped about a pair of parallel bolster wires 22, the ends 24 of said bolster wires being bent inwardly at right angles. As discussed hereinafter, the wrap is considerably wider than that used in previous constructions. The free ends of the stringer wires 14 are each singly wrapped about a pair of border wires 26, the ends 28 of which are also bent inwardly at a selected angle. Each of the bolster and border wires may include a paper wrapping or preferably an extruded coating of high density polyethylene to reduce friction and eliminate noise. All of the wires used in the system are oil-tempered wires to provide the desired resilience.

Because the system 10 is intended to be selfsupporting, the stringer wires 14 are constructed from thirteen gauge wires (ASTM standards) to provide the required stability and resilience. Fourteen gauge wires, as employed in the construction disclosed in U.S. Pat. No. 3,639,002, fail to provide adequate support. Twelve gauge wire is too stiff for the intended application and could possibly be felt through the seat in the absence of an insulator. Since an object of the invention is to provide seating comfort while also minimizing the number of parts, the weight, and the cost of the seat construction, stringer wires much heavier than thirteen gauge would not be suitable. The border and bolster wires are each made from twelve gauge wire. The plastic coating about the bolster wires is considerably thicker than that about the border wires due to the relatively wide double wrapping of the stringer wires thereabout. A coating of about 0.07 inches has been successfully employed.

Figure 5:
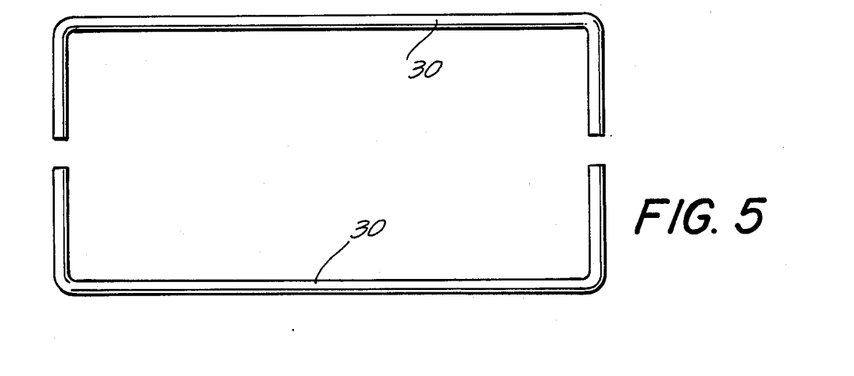
FIG. 5 is a top plan view of a cross member utilized in said frame.

Lateral support means may also be provided to maintain the system in the desired configuration without compromising seating comfort. While this may be accomplished in a number of ways, cross members 30 as shown in FIG. 5 have been found to accomplish the basic object of resiliently maintaining the system in the configuration shown in FIG. 3. The number of cross members employed depends on the stability required for the system 10 as well as the size thereof. More will be required for a bench seat than a bucket seat assuming the same stability is desired for both. In the embodiments of the invention disclosed herein, the cross members are made from wire having about twice the diameter of the stringer wires.

Each cross member is constructed from a wire of selected gauge which is bent into a substantially U-shaped configuration as shown in FIG. 5. The opposing ends of the cross members are stapled respectively to a bolster wire 22 on one side of the system 10 (using staples 32) and to the diagonally opposing border wire 26. The ends of the wires defining the cross members may be bent inwardly (not shown) to insure they do not slip through the staples.

The suspension system 10 may be assembled to a frame 34 or any flat surface by metal fasteners or tabs 36 which are bent over selected portions of the border wires. The inwardly bent ends 28 of the wires are clamped to prevent longitudinal displacement of the system 10 within the bucket seat 12. Lateral displacement is prevented by affixing the longer portions of the border wires to the frame 34.

Figure 4:
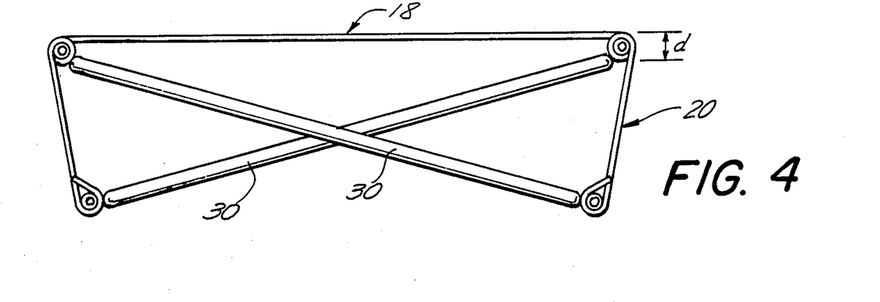
FIG. 4 is a front elevation view of said wire frame.
Figure 6:
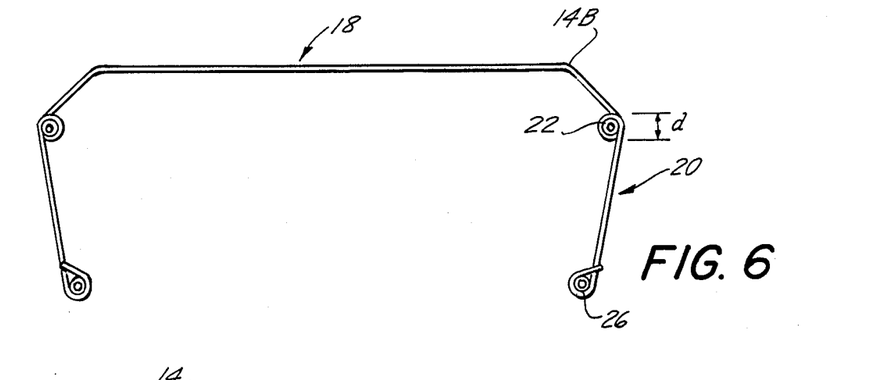
FIG. 6 is a front elevation view of an alternative embodiment of a wire frame in accordance with the invention.

As shown in FIG. 4, the system may be symmetrical in construction with each leg portion 20 extending at an acute angle from the plane defined by the top portion 18. Symmetrical cross members 30 are provided in the front and rear portions thereof. In the alternative embodiment of the invention shown in FIG. 6, the stringer wires 14 include a pair of symmetrical bends 14A therein which elevate the top portion 18B of the system with respect to the bolster wires 22. This construction provides somewhat greater resiliency than where the top portion is entirely flat.

Figure 7:
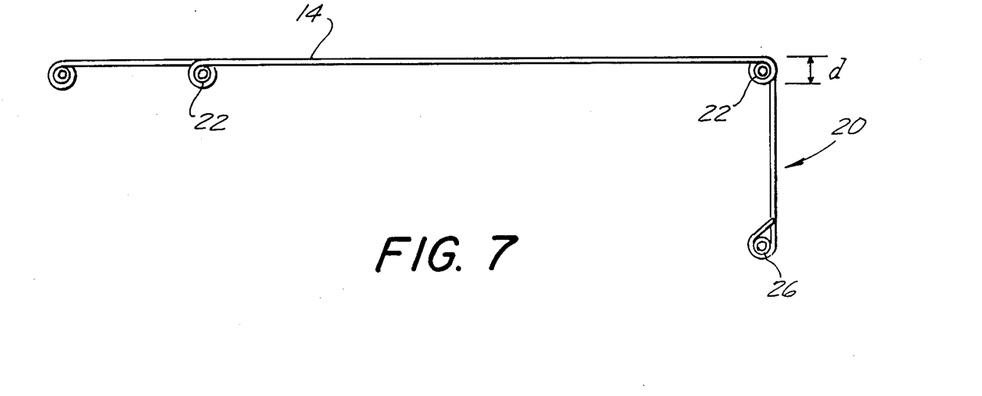
FIG. 7 is a front elevation view of another alternative embodiment of a wire frame in accordance with the invention.

Depending upon the configuration of the seat in which the suspension system is to be installed, the opposing border and bolster wires may or may not run parallel to each other. The leg portions 20 need not both be oriented at the same angle with respect to the top portion 18, and in some applications (as shown in FIG. 7) one of the leg portions may be coplanar therewith. The stringer wires are spaced at equal intervals for virtually all applications, the distances varying between one and two and one-half inches depending upon the support which is required.

Since the system must be able to support considerable weight and pass rigorous cycle testing involving repeated applications of a load, it is important for the areas subject to the most stress to be sufficiently durable. The double wrapping of the stringer wires about the bolster wires is sufficiently wide that it has such durability. In a preferred embodiment of the invention, the outside diameter of the wrapping was 0.43 inches. This is substantially wider than the 0.32 inch wrapping in structures as shown in the aforementioned U.S. Pat. No. 3,639,002. Tests indicated the tighter wrapping would result in snapped stringer wires after repeated load applications. Using the preferred thirteen gauge wires, the outside diameter d of the double wrappings about the bolster wires should be at least about 0.37 inches. The coated bolster wires have sufficient diameters such that the stringer wires are wrapped fairly snugly thereabout.

Figure 8:
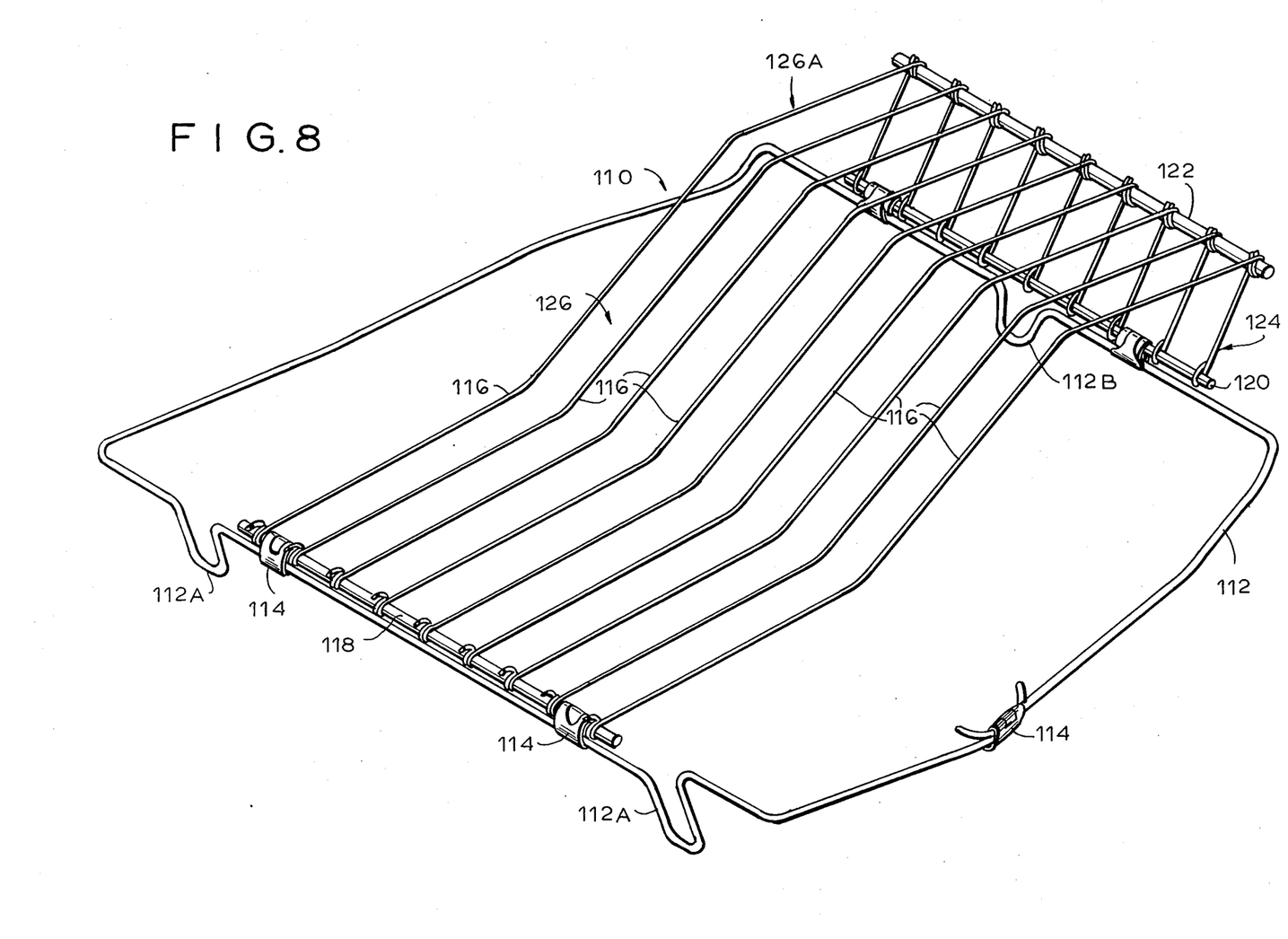
FIG. 8 is a perspective view of a suspension system for a rear automobile seat.
Figure 9:
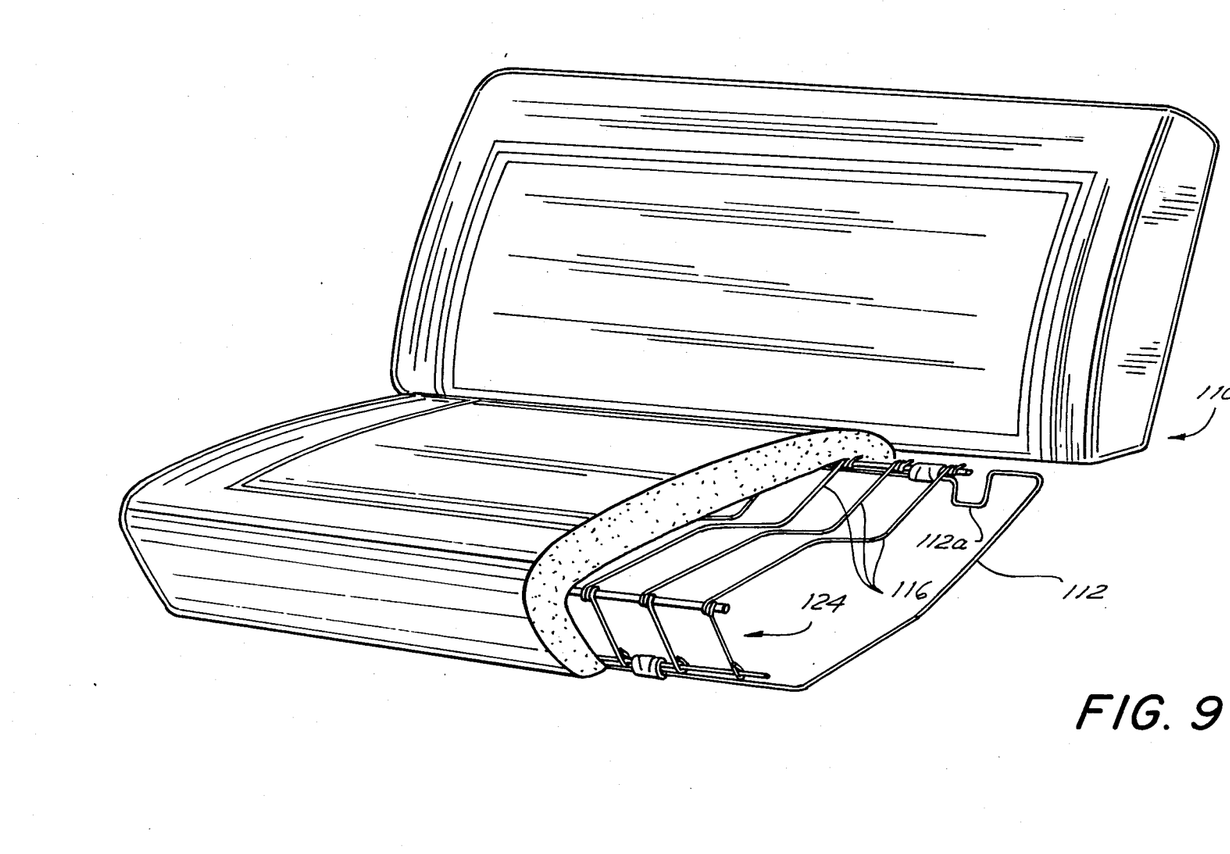
FIG. 9 is a partially cutaway perspective view of a seat construction including the suspension shown in FIG. 8.

FIG. 8 illustrates a wire frame suspension system 110 for the rear seat of a motor vehicle. The system includes a substantially rectangular wire frame 112, the ends of which are bent inwardly and secured by a clamp 114. Two generally U-shaped rear feet 112A and one generally U-shaped front foot 112B are defined by the frame 112. Each foot may be secured to the floor of the motor vehicle.

A plurality of thirteen gauge stringer wires 116 extend longitudinally with respect to the wire frame 112 and are substantially parallel to each other. The wires are contoured to provide adequate support for a person's thighs. A first border wire 118 is secured to the rear end of the frame 112 by a pair of clamps 114. A second border wire 120 is clamped to the front end of the frame 112. A bolster wire 122 is positioned above and parallel to the second bolster wire 120. Each border and bolster wire is constructed from twelve gauge, oil-tempered wire encapsulated by an extruded coating of high density polyethylene. The stringer wires are double wrapped about the first border wire and the bolster wire and single wrapped about the second border wire. The second border wire and the bolster wire are positioned such that the front leg portion 124 defined by the stringer wires 112 extends at an acute angle with respect to the stringer wires defining the thigh supporting portion 126A of the upper surface 126 of the suspension system 110. This provides the necessary resilience at the front end of the vehicle seat.

It will be appreciated by those skilled in the art that the suspension system provided herein has many applications and can be adapted for use in many types of vehicle seats. The leg portions may be oriented in the same or opposite directions with respect to the top portion and can be of the same or different lengths. While neither twelve nor fourteen gauge wire has been found to be suitable for the system, the wire may be somewhat lighter or heavier than thirteen gauge and still provide adequate performance. It would also be possible to include, in alternating sequence or otherwise, stringer wires of various gauges with the preferred thirteen gauge wire.

What is claimed is:

1. A self-contained vehicle seat suspension system comprising generally parallel spaced front and rear border wires, a bolster wire located outwardly of and above the front border wire, a plurality of spaced, generally parallel stringer wires being interconnected at their ends by double wrap attachment to the border wires, the stringer wires being interconnected intermediate their ends only by double-wrap attachment to the bolster wire to divide the stringer wires into pairs of legs such that the legs form an acute angle, and a wire frame attached to the border wires, thus enabling the suspension system to be attached as a unit to a vehicle supporting structure.

2. The vehicle seat suspension system of claim 1, including means for attaching the wire frame to a supporting structure comprising a U-shaped foot formed integrally thereon adjacent each of the border wires.

3. A self-contained, self-supporting and resilient suspension system for a seat construction, comprising:
a substantially rectangular wire frame,
first and second substantially parallel border wires secured, respectively, to opposite sides of said wire frame,
said stringer wires being made from oil-tempered, thirteen gauge wires,
a plurality of substantially parallel stringer wires extending between and secured to said border wires, a bolster wire extending substantially parallel to and above a plane defined by said first and second border wires, each of said stringer wires being wrapped about said bolster wire, said bolster wire being substantially closer to said first border wire than said second border wire, said stringer wires extending between said bolster wire and said first border wire defining a leg portion of said suspension system, said stringer wires extending between said bolster wire and said second border wire defining a seat supporting portion, and said wire frame including an integrally formed, generally U-shaped foot extending beneath one of said first and second border wires.

4. A self-contained vehicle seat suspension system comprising a generally rectangular wire frame, parallel spaced front and rear border wires attached to the frame, a bolster wire lying generally above and parallel to the front border wire, and a plurality of spaced, generally parallel stringer wires interconnected at their ends by double-wrap attachment to the border wires, the stringer wires being interconnected intermediate their ends only by double-wrap attachment to the bolster wire to divide each stringer wire into two distinct portion which form an acute angle at the bolster wire, the wire frame including an integrally formed U-shaped foot for attachment the a vehicle supporting structure, thus enabling the suspension system to be attached as a unit to a vehicle.

* * * * *

UNITED STATES PATENT AND TRADEMARK OFFICE
CERTIFICATE OF CORRECTION

PATENT NO. : 4,854,643

DATED : August 8, 1989

INVENTOR(S) : Brian S. Cojocari, et al.

It is certified that error appears in the above-identified patent and that said Letters Patent is hereby corrected as shown below:

Col. 6, line 11 - "portion" should read --portions--

Col. 6, line 13 - "the" should read --to--

Signed and Sealed this

Fifteenth Day of May, 1990

*Attest:*

HARRY F. MANBECK, JR.

*Attesting Officer*   *Commissioner of Patents and Trademarks*